United States Patent
Cho et al.

(10) Patent No.: US 9,001,404 B2
(45) Date of Patent: Apr. 7, 2015

(54) DISPLAY APPARATUS AND METHOD OF MANUFACTURING THE SAME

(75) Inventors: Hyun Min Cho, Hwaseong-si (KR); Sungsik Yun, Suwon-si (KR); Dae Hyun Kim, Suwon-si (KR); Jae Byung Park, Seoul (KR)

(73) Assignee: Samsung Display Co., Ltd. (KR)

( * ) Notice: Subject to any disclaimer, the term of this patent is extended or adjusted under 35 U.S.C. 154(b) by 318 days.

(21) Appl. No.: 13/550,976

(22) Filed: Jul. 17, 2012

(65) Prior Publication Data
US 2013/0163063 A1    Jun. 27, 2013

(30) Foreign Application Priority Data
Dec. 22, 2011  (KR) .................. 10-2011-0140449

(51) Int. Cl.
G02B 26/02    (2006.01)

(52) U.S. Cl.
CPC ..................................... *G02B 26/02* (2013.01)

(58) Field of Classification Search
CPC .... G02B 26/02; G02B 26/08; G02B 26/0833; G02B 26/0841; G02B 27/026
USPC ............... 359/230–233, 290–292, 237, 242, 359/223.1, 224.1
See application file for complete search history.

(56) References Cited

U.S. PATENT DOCUMENTS

| | | | |
|---|---|---|---|
| 7,271,945 B2 | 9/2007 | Hagood et al. | |
| 7,304,785 B2 | 12/2007 | Hagood et al. | |
| 7,417,782 B2 | 8/2008 | Hagood et al. | |
| 7,852,546 B2 * | 12/2010 | Fijol et al. | ............ 359/291 |
| 7,876,489 B2 | 1/2011 | Gandhi et al. | |
| 2011/0032246 A1 | 2/2011 | Hong et al. | |
| 2011/0102876 A1 | 5/2011 | Cho et al. | |

FOREIGN PATENT DOCUMENTS

| | | |
|---|---|---|
| KR | 1020070114161 A | 11/2007 |
| KR | 1020070114162 A | 11/2007 |
| KR | 1020070115965 A | 12/2007 |
| KR | 1020070117599 A | 12/2007 |
| KR | 1020080037072 A | 4/2008 |
| KR | 1020080090397 A | 10/2008 |

\* cited by examiner

*Primary Examiner* — Euncha Cherry
(74) *Attorney, Agent, or Firm* — Cantor Colburn LLP

(57) ABSTRACT

A display apparatus includes a first insulating substrate, a light shielding layer on the first insulating substrate and including a first opening through which a light passes, a second insulating substrate which faces the first insulating substrate, and a shutter part on the second insulating substrate. The shutter part includes a driving beam electrode, a deformable electrode which faces the driving beam electrode and moves in response to a voltage applied to the driving beam electrode, and a shutter. The shutter includes a second opening which corresponds to the first opening of the light shielding layer, is connected to the deformable electrode and overlaps one of the deformable electrode or the driving beam electrode according to a movement of the deformable electrode, in a plan view.

13 Claims, 17 Drawing Sheets

DISPLAY APPARATUS AND METHOD OF MANUFACTURING THE SAME

This application claims priority to Korean Patent Application No. 10-2011-0140449 filed on Dec. 22, 2011, and all the benefits accruing therefrom under 35 U.S.C. §119, the contents of which are herein incorporated by reference in its entirety.

BACKGROUND OF THE INVENTION

1. Field of the Invention

The invention relates to a display apparatus and a method of manufacturing the same. More particularly, the invention relates to a display apparatus having a microelectromechanical system ("MEMS") shutter and a method of manufacturing the display apparatus.

2. Description of the Related Art

Various display apparatuses, such as a liquid crystal display ("LCD"), a plasma display panel ("PDP"), an organic light emitting display ("OLED"), a field effect display ("FED"), an electrophoretic display ("EPD"), a MEMS display, etc., are used to display an image.

The MEMS display employing a micro-shutter has properties such as high light utilization efficiency, fast-switching characteristic, etc. Since the micro-shutter is deformed by electrostatic force in accordance with application of electric field, the MEMS display directly transmits or blocks light using the deformation characteristic of the micro-shutter. Accordingly, the MEMS display has a short and fast response time at low driving voltages.

BRIEF SUMMARY OF THE INVENTION

One or more exemplary embodiments of the invention provide a display apparatus enhancing an aperture ratio and reducing power consumption.

One or more exemplary embodiments of the invention provide a method of manufacturing the display apparatus.

According to exemplary embodiments, a display apparatus includes a first substrate and a second substrate.

The first substrate includes a first insulating substrate, and a light shielding layer on the first insulating substrate and including a first opening through which a light passes. The second substrate includes a second insulating substrate which faces the first insulating substrate, and a shutter part on the second insulating substrate.

The shutter part includes a driving beam electrode, a deformable electrode and a shutter. The driving beam electrode is on the second insulating substrate and a voltage is applied to the driving beam electrode. The deformable electrode is on the second insulating substrate, faces the driving beam electrode and moves in response to the voltage applied to the driving beam electrode. The shutter includes a second opening which corresponds to the first opening, is connected to the deformable electrode and overlaps one of the deformable electrode or the driving beam electrode according to a movement of the deformable electrode, in a plan view.

According to exemplary embodiments, the shutter further includes a first flat plate substantially parallel to an upper surface of the second insulating substrate. The first flat plate includes a lower surface which faces the second insulating substrate and an upper surface which faces the first insulating substrate. The driving beam electrode and the deformable electrode are spaced apart from the lower surface of the first flat plate.

According to exemplary embodiments, the shutter is substantially parallel to an upper surface of the second insulating substrate. The shutter includes a second flat plate including a lower surface which faces the second insulating substrate and an upper surface which faces the first insulating substrate, and a protrusion part which protrudes from the lower surface of the flat plate toward the second insulating substrate. The protrusion part includes a first shutter and a second shutter. The first shutter includes a first sidewall, and the second shutter includes a second sidewall, a second flat plate and a third flat plate.

The first sidewall is between the lower surface of the second flat plate and the upper surface of the second insulating substrate, and includes two sidewall portions substantially perpendicular to the upper surface of the second insulating substrate and facing each other. In a cross-sectional view, an end of the first sidewall is coplanar with a lower side surface of a first deformable electrode and a lower side surface of a first driving beam electrode. The second sidewall includes two sidewall portions substantially perpendicular to the upper surface of the second substrate, facing each other and substantially parallel to the first sidewall. The second sidewall portions each include two bends at a position at which the second sidewall contacts the first sidewall. The third flat plate is substantially parallel to the upper surface of the second insulating substrate, and includes an upper surface which faces the first insulating substrate and a lower surface which faces the second insulating substrate.

The lower surface of the second flat plate is spaced apart from the deformable electrode and the driving beam electrode.

According to exemplary embodiments, a method of manufacturing a display apparatus includes forming a first substrate and a second substrate, and disposing the first and second substrates to face each other.

The first substrate is formed by preparing a first insulating substrate, and forming a light shielding layer including a first opening, on the first insulating substrate.

According to exemplary embodiments, the second substrate is formed by forming a first sacrifice pattern on a second insulating substrate, forming a second sacrifice pattern on the first sacrifice pattern, forming a first conductive layer on the second sacrifice pattern using a conductive material, etching the first conductive layer to form a deformable electrode and a driving beam electrode, forming a third sacrifice pattern on the second sacrifice pattern, forming a second conductive layer on the third sacrifice pattern using a conductive material, patterning the second conductive layer to form a shutter, and removing the first, second and third sacrifice patterns.

According to alternative exemplary embodiments, the second substrate is formed by forming a first sacrifice pattern on a second insulating substrate, forming a second sacrifice pattern on the first sacrifice pattern, forming a first conductive layer on the second sacrifice pattern using a conductive material, etching the first conductive layer to form a deformable electrode, a driving beam electrode and a first shutter, forming a third sacrifice pattern on the second sacrifice pattern, forming a second conductive layer on the third sacrifice pattern using a conductive material, patterning the second conductive layer to form a second shutter, and removing the first, second and third sacrifice patterns.

According to one or more exemplary embodiments, the display apparatus enhances the aperture ratio of the pixel, thereby reducing power consumption. In addition, the formed display apparatus has improved aperture ratio.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
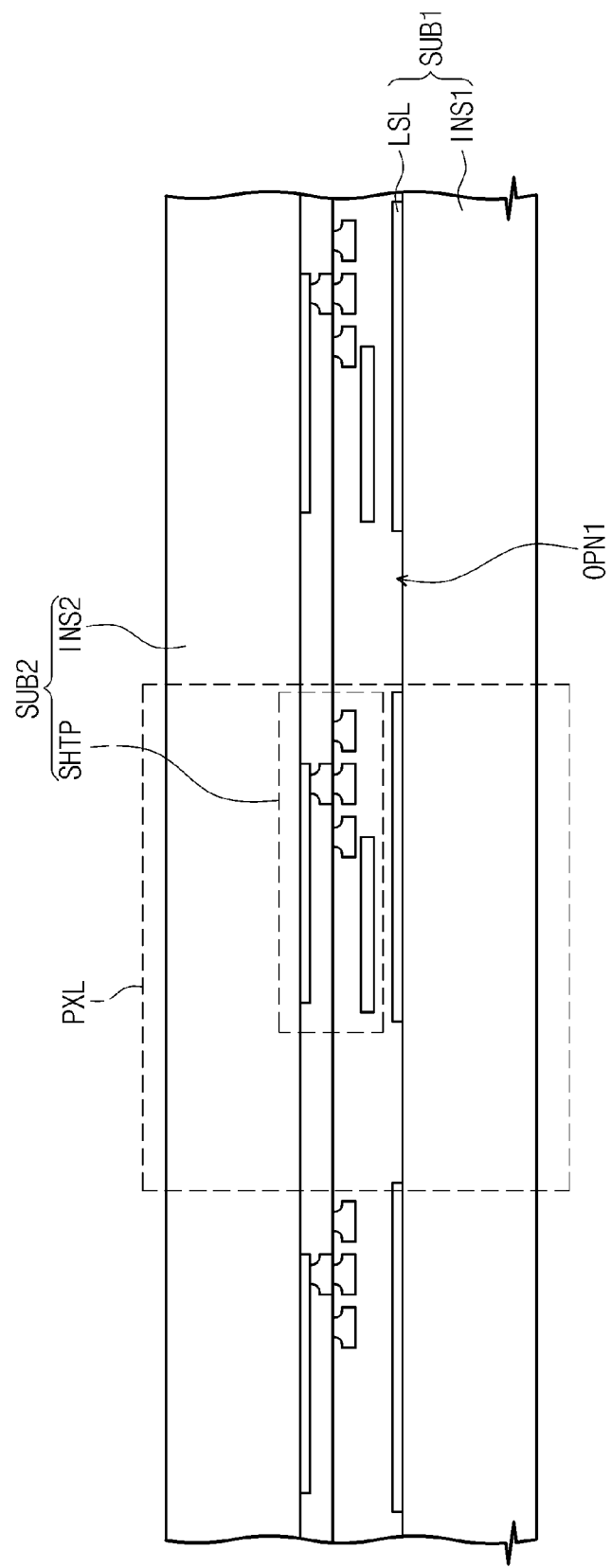
FIG. 1 is a cross-sectional view showing an exemplary embodiment of a display apparatus according to the invention.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
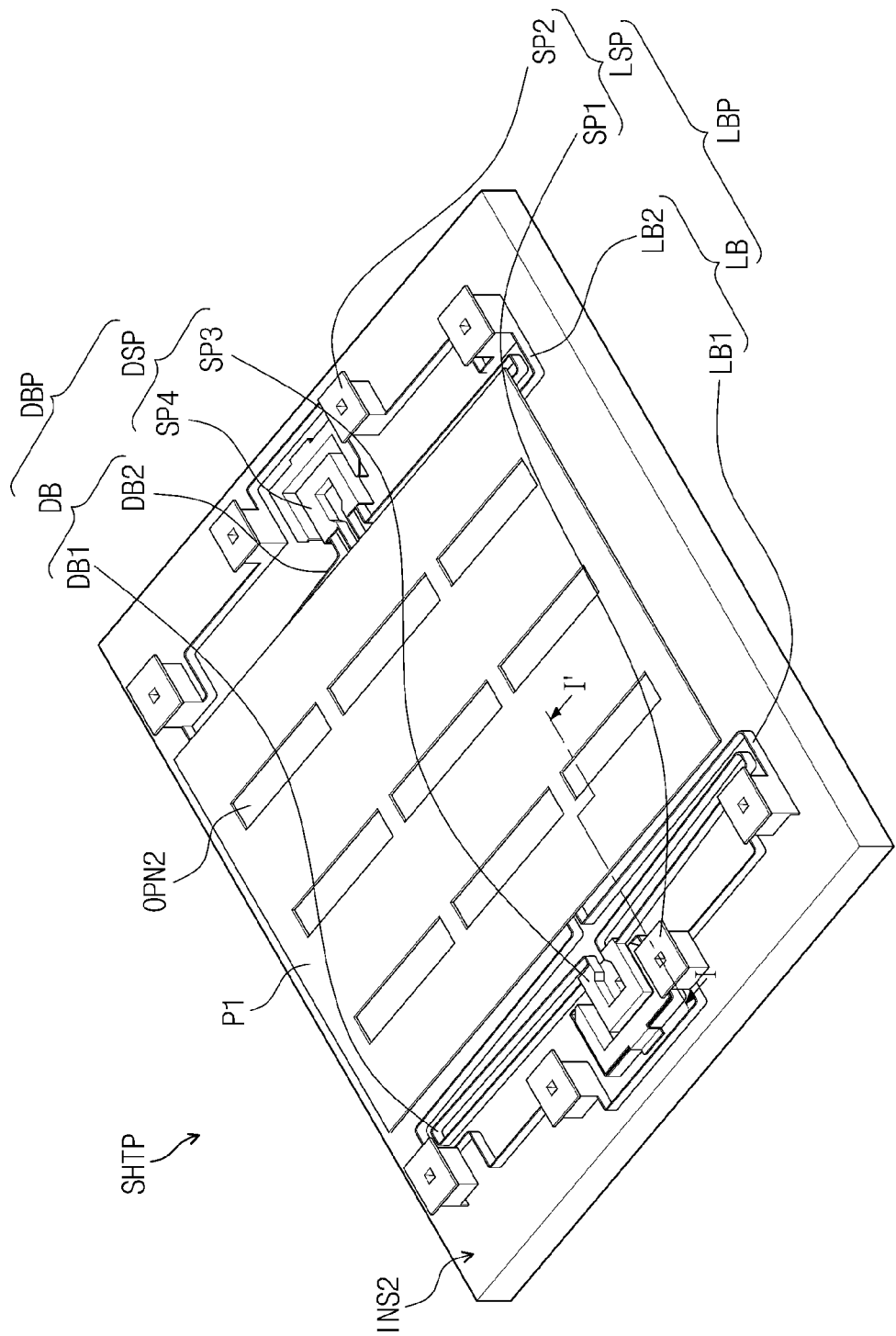
FIG. 2 is a perspective view showing an exemplary embodiment of a shutter part of a display apparatus according to the invention.
Figure 3:
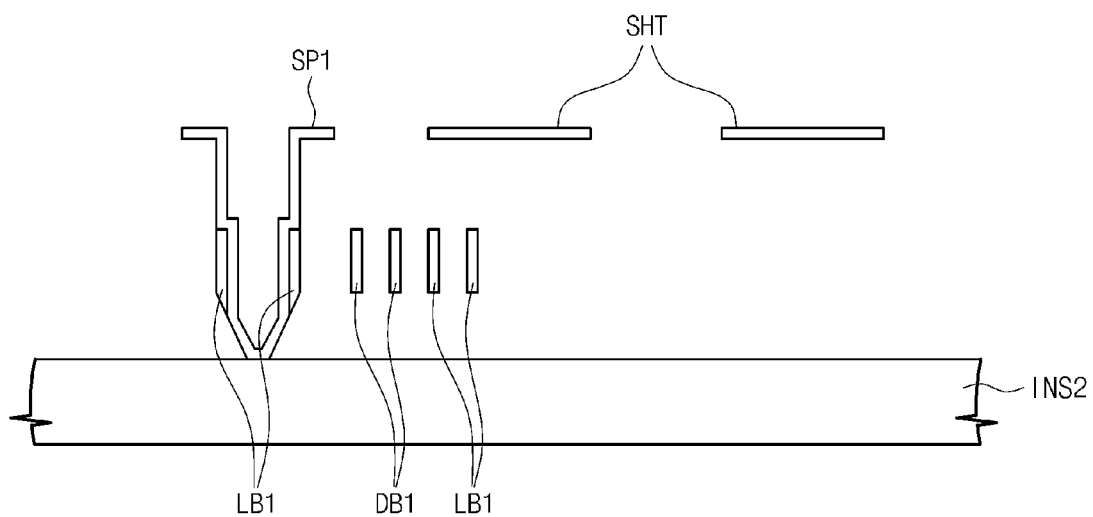
FIG. 3 is a cross-sectional view taken along line I-I' shown in FIG. 2.

FIG. 1 is a cross-sectional view showing an exemplary embodiment of a display apparatus according to the invention, FIG. 2 is a perspective view showing an exemplary embodiment of a shutter part of a display apparatus according to the invention, and FIG. 3 is a cross-sectional view taken along line I-I' shown in FIG. 2.

Referring to FIG. 1, a display apparatus includes a plurality of pixels PXL arranged in a matrix form in a plan view of the display apparatus. For the convenience of explanation, one shutter part corresponding to one pixel PXL has been shown in FIG. 2.

Referring to FIGS. 1 to 3, the display apparatus includes a first substrate SUB1, and a second substrate SUB2 facing the first substrate SUB 1.

The first substrate SUB1 includes a first insulating substrate INS1, and a light shielding layer LSL disposed on the first insulating substrate INS1.

The first insulating layer INS1 includes a transparent insulating material, such as glass, plastic, crystal, etc.

The light shielding layer LSL is disposed in the first insulating substrate SUB1. The light shielding layer LSL is used to reflect or absorb a light from an external light source (not shown). In one exemplary embodiment, for instance, among the light from the external light source, the light shielding layer LSL reflects the light traveling upward and absorbs the light traveling downward with respect to the insulating substrate INS 1. The light shielding layer LSL may have a single layer structure, or a multi-layer structure including a light reflecting layer and a light absorbing layer. In the case of the multi-layer structure, the light reflecting layer is disposed on the first insulating substrate INS1, and the light absorbing layer is disposed on the light reflecting layer. The light reflecting layer may include a metal material or may be a dielectric mirror of multi-dielectric layers having different refractive indexes from each other. The light absorbing layer should not be limited to a specific material as long as the light absorbing layer absorbs the light. As an example, the light absorbing layer may include a mixture of chromium (Cr) and chromium oxide (CrOx).

The light shielding layer LSL includes a plurality of openings OPN1 (hereinafter, referred to as first openings) which extends through a thickness of the light shielding layer LSL. The first openings OPN1 provide paths through which the light passes through the light shielding layer LSL. The light traveling to a portion of the light shielding layer LSL except for the first openings OPN1 is reflected from or absorbed by the light shielding layer LSL. Particularly, in the case that a separate light source (not shown) is disposed at a side of and under the first insulating substrate INS1, the light shielding layer LSL reflects or transmits the light emitted from the separate light source and traveling upwardly from the separate light source.

In the exemplary embodiment, the light shielding layer LSL may include nine first openings OPN1 having two different dimensional sizes and being substantially rectilinear in planar shape. However, the shape and the number of the first openings OPN1 is not limited to the exemplary embodiment, and may be provided in various quantities and sizes in alternative exemplary embodiments. The first openings OPN1 may be enclosed openings which are defined solely by the light shielding layer LSL.

The second substrate SUB2 includes a second insulating substrate INS2 and a shutter part SHTP.

The second insulating substrate INK is disposed spaced apart from the first insulating substrate INS1 and faces the first insulating substrate INS 1. The second insulating substrate INS2 includes a transparent insulating material, such as glass, plastic, crystal, etc.

The shutter part SHTP is disposed on the second insulating substrate INS2 and is movable with respect to the first insulation substrate INS1 to different positions to transmit or block the light. The shutter part SHTP includes a switching device, a deformable electrode part LBP, a driving beam electrode part DBP and a shutter SHT.

The switching device is disposed on the second insulating substrate INS2 and switches the shutter SHT to move the shutter SHT according to an image signal. The switching device includes a first switching device (not shown) and a second switching device (not shown), which are operated independently from each other. The switching device may be a thin film transistor connected to a signal line that transmits the image signal. Although not shown in figures, the signal line may include a gate line and a data line, and the thin film transistor may be connected to the gate line and the data line. The thin film transistor applies a data voltage provided through the data line to the shutter SHT in response to a gate-on signal provided through the gate line.

The deformable electrode part LBP includes a deformable electrode LB and a deformable-electrode supporter LSP.

The deformable electrode LB includes a first deformable electrode portion LB1 and a second deformable electrode portion LB2. The first deformable electrode portion LB1 has elasticity, and an elongated shape which is supported at ends thereof, such that the first deformable electrode portion LB1 has a beam shape. A first end of the first deformable electrode portion LB1 is connected to a first side of the shutter SHT. The second deformable electrode portion LB2 has elasticity, and an elongated shape which is supported at ends thereof, such that the second deformable electrode portion LB2 has a beam shape. A first end of the second deformable electrode portion LB2 is connected to a second side of the shutter SHT opposite to the first side. Each of the first and second deformable electrode portions LB1 and LB2 may include one or more layers, and the layers may include different materials from each other.

The deformable-electrode supporter LSP includes a first supporter SP1 and a second supporter SP2. The first supporter SP1 is connected to a second end of the first deformable electrode portion LB1 opposite to the first end, and fixes the first deformable electrode portion LB1 to the second insulating substrate INS2. The second supporter SP2 is connected to a second end of the second deformable electrode portion LB2 opposite to the first end, and fixes the second deformable electrode portion LB2 to the second insulating substrate INS2.

The driving beam electrode part DBP includes a driving beam electrode DB and a driving beam electrode supporter DSP.

The driving beam electrode DB includes a first driving beam electrode portion DB1 and a second driving beam electrode portion DB2. The first driving beam electrode portion DB1 has elasticity, and an elongated shape which is supported at ends thereof, such that the first driving beam electrode portion DB1 has a beam shape. The first driving beam electrode portion DB1 is spaced apart from the first deformable electrode portion LB1 and faces the first deformable electrode portion LB1. The first driving beam electrode portion DB1 is electrically connected to the first switching device (not shown). The first driving beam electrode portion DB1 receives a data voltage from the first switching device (not shown) to move the first deformable electrode portion LB1 using electrical repulsive and attractive forces. The second driving beam electrode portion DB2 has elasticity, and an elongated shape which is supported at ends thereof, such that the second driving beam electrode portion DB2 has a beam shape. The second driving beam electrode portion DB2 is spaced apart from the second deformable electrode portion LB2 and faces the second deformable electrode portion LB2. The second driving beam electrode portion DB2 is electrically connected to the second switching device (not shown). The second driving beam electrode portion DB2 receives the data voltage from the second switching device (not shown) to move the second deformable electrode portion LB2 using electrical repulsive and attractive forces. Each of the first and second driving beam electrode portions DB1 and DB2 may include one or more layers, and the layers may include different materials from each other.

The driving beam electrode supporter DSP includes a third supporter SP3 and a fourth supporter SP4. The third supporter SP3 is connected to the first driving beam electrode portion DB1 and fixes the first driving beam electrode portion DB1 to the second insulating substrate INS2. The fourth supporter SP4 is connected to the second driving beam electrode portion DB2 and fixes the second driving beam electrode portion DB2 to the second insulating substrate INS2.

Each of the first deformable electrode portion LB1, the second deformable electrode portion LB2, the first driving electrode portion DB1 and the second driving beam electrode portion DB2 may have a plate-like shape elongated in a direction and may be bent along the direction to have the elasticity. Each of the electrode portions LB1, LB2, DB1 and DB2 has opposing surfaces which have the widest planar area of all the surfaces of the electrode portions LB1, LB2, DB1 and DB2. Referring to FIG. 3, for example, left and right vertical surfaces of the first deformable electrode portion LB1 are referred to as a first surface and a second surface, respectively. Similarly, opposing surfaces which have the widest planar area of the first driving beam electrode portion DB1 are referred to as a first surface and a second surface, respectively. Each of the first surfaces and the second surfaces is disposed vertical (e.g., substantially perpendicular) to an upper surface of the second insulating substrate INS2.

In addition, remaining surfaces of the electrode portions LB1, LB2, DB1 and DB2 except for the first and second surfaces described above are referred to as side surfaces of the electrode portions LB1, LB2, DB1 and DB2. The side surfaces include horizontal surfaces and other vertical surfaces A horizontal surface that is relatively far away from and substantially parallel to the second insulating substrate INS2 is referred to as an upper side surface, a horizontal surface that is relatively closer to and substantially parallel to the second insulating substrate INS2 is referred to as a lower side surface, and the two other vertical surfaces between the first surface and the second surface are disposed vertical (e.g., substantially perpendicular) to the upper surface of the second insulating substrate INS2 are referred to as vertical side surfaces.

Each of the first to fourth supporters SP1, SP2, SP3 and SP4 may be provided in a plural number. In one exemplary embodiment, for instance, the first supporter SP1 is provided in a plural number to more stably support the first deformable electrode portion LB1.

The shutter SHT is disposed substantially parallel to the upper surface of the second insulating substrate INS2 and includes a first flat plate P1 with upper and lower surfaces. The upper surface of the shutter SHT faces the first insulating substrate INS1, and the lower surface of the shutter SHT faces the second insulating substrate INS2 and is opposite to the upper surface of the shutter SHT. An extension surface of the lower surface of the first flat plate P1 is disposed to be spaced apart from the driving beam electrode DB and the deformable electrode LB in a vertical direction with respect to the extension surface. The shutter SHT is connected to the deformable electrode LB and overlapped with at least one of the electrode portions LB1, LB2, DB1 and DB2 according to the movement of the deformable electrode LB when viewed in a plan view.

The shutter SHT may include one or more layers, and the layers may include different materials from each other.

The shutter SHT includes at least one second opening OPN2 which is extended through a thickness of the shutter SHT. The second openings OPN2 may be provided in the same size, shape and number as those of the first openings OPN1 of the light shielding layer LSL. In the exemplary embodiment, the shutter SHT includes nine second openings OPN2 having two different dimensional sizes and being substantially rectilinear in planar shape, but the second openings OPN2 should not be limited thereto or thereby. That is, the shape and the number of the second openings OPN2 may be provided in various quantities and sizes in alternative exemplary embodiments. The second openings OPN2 may be enclosed openings which are defined solely by the first flat plate P1 of the shutter SHT.

According to the movement of the shutter SHT with respect to the light shielding layer LSL of the first substrate SUB1, an overlap area between the second openings OPN2 of the shutter SHT and the first openings OPN1 of the light shielding layer LSL is controlled. Thus, the light passes through the shutter part SHTP when the first openings OPN1 and the second openings OPN2 overlap, or does not pass through the shutter part SHTP when the first openings OPN1 and the second openings OPN2 do not overlap, thereby displaying black and white gray-scales.

In the exemplary embodiment, the deformable electrode LB includes the first and second deformable electrode portions LB1 and LB2, and the first and second deformable electrode portions LB1 and LB2 are respectively connected to the both opposing sides of the shutter SHT, but the invention should not be limited thereto or thereby. In one exemplary embodiment, for instance, the deformable electrode LB may be provided in a singular number and connected to only one side of the shutter SHT. In addition, the driving beam electrode DB should not be limited to include the first and second driving beam electrode portions DB1 and DB2. That is, the driving beam electrode DB may be provided in a singular number to correspond to the deformable electrode LB.

Hereinafter, another exemplary embodiment of a display apparatus according to the invention will be described with reference to FIGS. 4 and 5.

Figure 4:
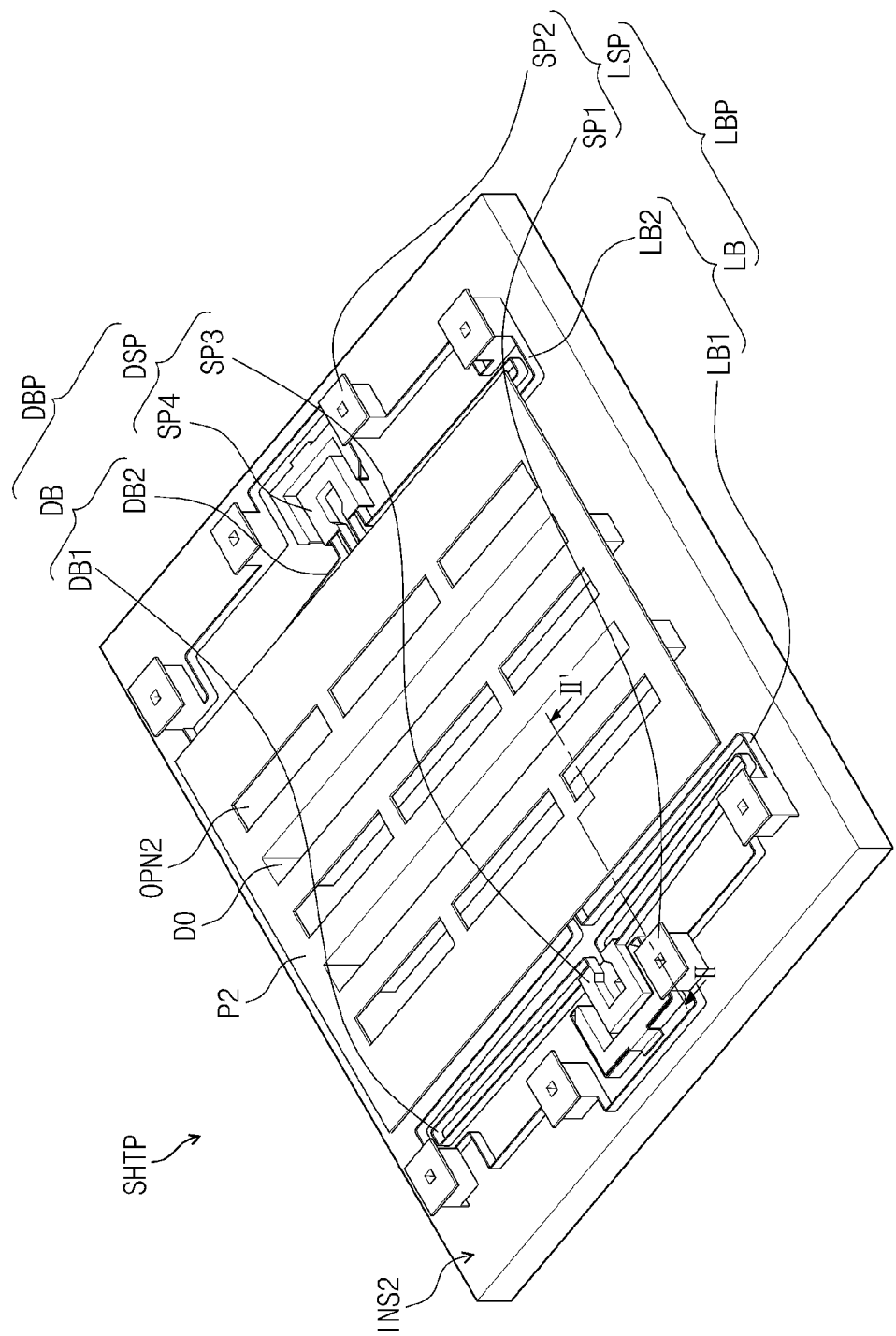
FIG. 4 is a perspective view showing another exemplary embodiment of a shutter part of a display apparatus according to the invention.
Figure 5:
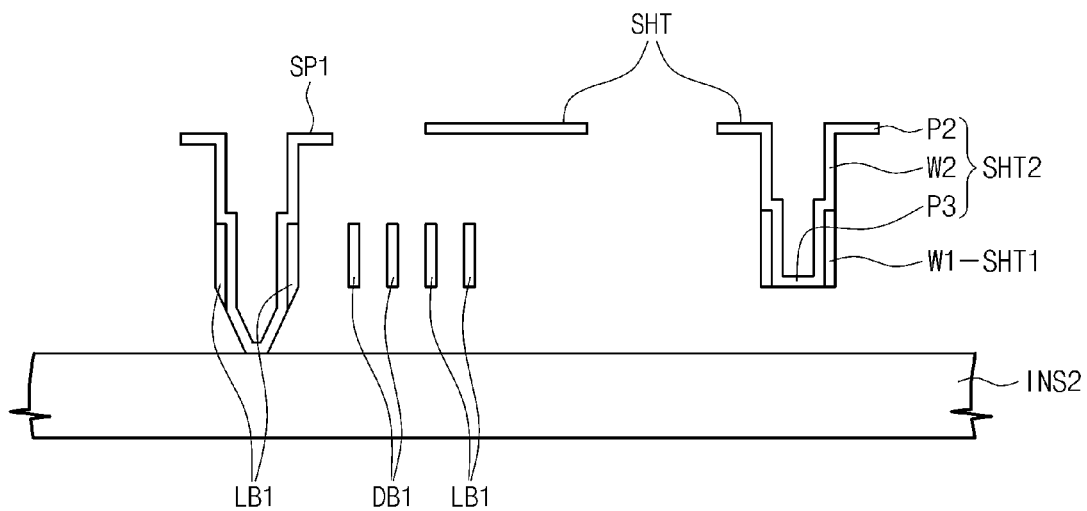
FIG. 5 is a cross-sectional view taken along line II-II' shown in FIG. 4.

FIG. 4 is a perspective view showing an exemplary embodiment of a shutter part of a display apparatus according to the invention and FIG. 5 is a cross-sectional view taken along line II-II' shown in FIG. 4. In FIGS. 4 and 5, the same reference numerals denote the same elements in FIGS. 1 to 3, and thus detailed descriptions of the same elements will be omitted in order to avoid redundancy. In detail, the display apparatus shown in FIGS. 4 and 5 has the same structure and function as those of the display apparatus shown in FIGS. 1 to 3 except for the shutter SHT. Accordingly, the shutter SHT will be mainly described with reference to FIGS. 4 and 5.

Referring to FIGS. 4 and 5, the shutter SHT is disposed substantially parallel to the upper surface of the second insulating substrate INK and includes a second flat plate P2 with upper and lower surfaces. The upper surface of the shutter SHT faces the first insulating substrate INS1, and the lower surface of the shutter SHT faces the second insulating substrate INS2 and is opposite to the upper surface of the shutter SHT. An extension surface of the lower surface of the second flat plate P2 is disposed to be spaced apart from the driving beam electrode DB and the deformable electrode LB in a vertical direction with respect to the extension surface.

The shutter SHT includes at least one protrusion part DO protruded from the lower surface there of the second flat plate P2 and toward the second insulating substrate INS2.

The protrusion part DO includes a first sidewall W1, a second sidewall W2 and a third flat plate P3.

The first sidewall W1 includes two sidewall portions facing each other. The first sidewall W1 is disposed between the lower surface of the second flat plate P2 and the upper surface of the second insulating substrate INS2, and disposed vertical (e.g., perpendicular) to the upper surface of the second insulating substrate INS2. In a cross-sectional view, a distal end of the first sidewall W1 is disposed at a position on a virtual extension line that connects a distal end of the first deformable electrode portion LB1 and a distal end of the first driving beam electrode portion DB1. The lower side surface of the electrode portions LB1 and DB2 is substantially coplanar with the distal end of the first sidewall W1, such that the lower side surface of the electrode portions LB1 and DB2 corresponds to the distal end of the first sidewall W1. The first sidewall W1 may include one or more layers, and the layers may include different materials from each other.

The second sidewall W2 includes two sidewall portions facing each other. Each of the sidewall portions is continuous with the second flat plate P2 and is bent from the second flat plate P2 to be perpendicular to the upper surface of the second insulating substrate INS2. Each of the second sidewall portions of the second sidewall W2 includes two bends at a position at which the second sidewall W2 makes contact with the first sidewall W1. Between the bends and the distal end of the second sidewall W2, the second sidewall W2 is disposed substantially parallel to the first sidewall W1. The second sidewall W2 may include one or more layers, and the layers may include different materials from each other.

The third flat plate P3 of the protrusion part DO is disposed substantially parallel to the upper surface of the second insulating substrate INS2, and includes an upper surface facing the first insulating substrate INS1 and a lower surface facing the second insulating substrate INS2. A virtual extension line connects the lower surface of the third flat plate P3 to the lower side surfaces of the first deformable electrode portion LB1 and the first driving beam electrode portion DB1, and to distal ends of the first sidewall W1 and the second sidewall W2 so as to be coplanar with each other. The third flat plate P3 may include one or more layers, and the layers may include different materials from each other.

The shutter SHT includes a first shutter portion SHT1 and a second shutter portion SHT2.

The first shutter portion SHT1 includes the first sidewall W1. The second shutter portion SHT2 includes the second sidewall W2, the second flat plate P2 and the third flat plate P3. The second sidewall W2, the second flat plate P2 and the third flat plate P3 collectively form a single, unitary, indivisible shutter SHT.

In the exemplary embodiment, the protrusion part DO includes the first sidewall W1, the second sidewall W2 and the third flat plate P3, but the protrusion part DO should not be limited thereto or thereby. The protrusion part DO may have various shapes as long as the protrusion part DO compensates for the sagging of the shutter SHT due to physical electrical force from the outside of the shutter SHT. In addition, the protrusion part DO may be provided in plural number for one shutter SHT and the protrusion parts DO may have different shapes and sizes from each other. The protrusion parts DO may alternate with the second openings OPN2.

The shutter SHT includes one or more second openings OPN2 which is extended through a thickness of the shutter SHT. The second openings OPN2 may be provided in the same size, shape and number as those of the first openings OPN1 of the light shielding layer LSL.

The first and second openings OPN1 and OPN2 are overlapped with at least one of the electrode portions LB1, LB2, DB1 and DB2 in a plan view.

In the exemplary embodiment, the shutter SHT includes nine second openings OPN2 having two different dimensional sizes and being substantially rectilinear in planar shape, but the second openings OPN2 should not be limited thereto or thereby. That is, the size and the number of the second openings OPN2 may be provided in various quantities and sizes in alternative exemplary embodiments. The second openings OPN2 may be enclosed openings which are defined solely by the second flat plate P2 of the shutter SHT.

The shutter SHT is connected to the deformable electrode LB and is overlapped with at least one of the electrode portions LB1, LB2, DB1 and DB2 according to the movement of the deformable electrode LB when viewed in a plan view.

According to the movement of the shutter SHT with respect to the light shielding layer LSL of the first substrate SUB1, an overlap area between the second openings OPN2 of the shutter SHT and the first openings OPN1 of the light shielding layer LSL is controlled. Thus, the light passes through the shutter part SHTP when the first openings OPN1 and the second openings OPN2 overlap or does not pass through the shutter part SHTP when the first openings OPN1 and the second openings OPN2 do not overlap, thereby displaying black and white gray-scales.

As described above, when the shutter SHT includes the protrusion part DO, deformation of the shutter SHT due to the physical electrical force caused by the movement of the shutter SHT may be reduced or effectively prevented.

Hereinafter, an exemplary embodiment of a method of manufacturing the display apparatus according to the invention will be described in detail with reference to FIGS. 6A to 6I. In this case, FIGS. 2 and 3 may be further referred to for the description of the method.

The display apparatus is manufactured by fabricating the first substrate SUB1 and the second substrate SUB2, and positioning the first substrate SUB1 and the second substrate SUB2 to face each other.

The first substrate SUB1 is fabricated by preparing the first insulating substrate INS1 and forming the light shielding layer LSL including the first openings OPN1, on the first insulating substrate SUB1. The light shielding layer LSL provided with the first openings OPN1 is formed by forming a light shielding material layer on the first insulating substrate INS1 and patterning the light shielding material layer, such as by using a photolithography process.

FIGS. 6A to 6I are cross-sectional views showing an exemplary embodiment of a method of manufacturing the second substrate SUB2 of the display apparatus according to the invention. For the convenience of explanation, the first deformable electrode portion LB1, the first driving beam electrode portion DB1 and the shutter SHT will be mainly described in FIGS. 6A to 6I. The second deformable electrode portion LB2 and the second driving beam electrode portion DB2 are formed by the same or substantially the same process as the first deformable electrode portion LB1 and the first driving beam electrode portion DB1.

Referring to FIGS. 6A to 6I, the second insulating substrate INK is prepared and the first switching device (not shown), the first deformable electrode portion LB1, the first driving beam electrode portion DB1 and the shutter SHT are formed on the second insulating substrate INS2, thereby fabricating the second substrate SUB2.

Figure 6A:
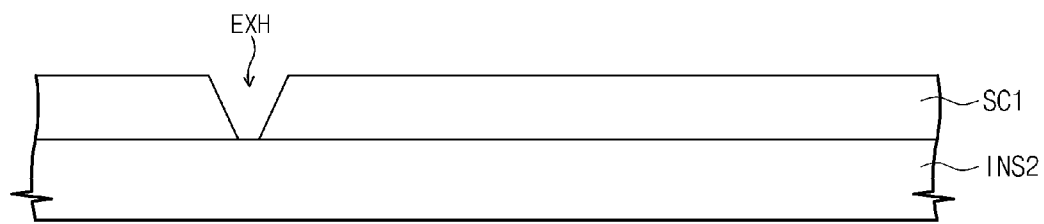
FIGS. 6A to 6I are cross-sectional views showing an exemplary embodiment of a method of manufacturing a second substrate of a display apparatus according to the invention.

In detail, referring to FIG. 6A, the first switching device (not shown) is formed on the second insulating substrate INS2, and a first sacrifice pattern SC1 is formed on the second insulating substrate INS2 including the first switching device (not shown).

The first switching device (not shown) may be formed using a plurality of masks. The first sacrifice pattern SC1 is formed on the second insulating substrate INS2 and provided with an exposure hole EXH to expose a portion of the first switching device (not shown). The first sacrifice pattern SC1 is formed by forming a first sacrifice layer on the second insulating substrate INS2 including the first switching device (not shown) and patterning the first sacrifice layer using a photolithography process.

Figure 6B:
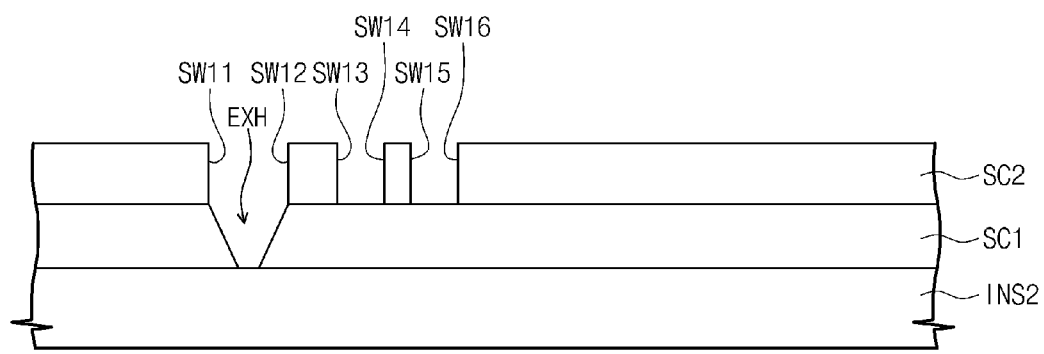

Referring to FIG. 6B, a second sacrifice pattern SC2 is formed on the first sacrifice pattern SC1. The second sacrifice pattern SC2 is formed by forming a second sacrifice layer on the first sacrifice pattern SC1 and patterning the second sacrifice layer using a photolithography process. During the photolithography process, the second sacrifice layer is partially etched, and thus first sacrifice sidewalls SW11 to SW16 are formed, which are vertical (e.g., substantially perpendicular) to the upper surface of the second insulating substrate INS2. When viewed in a plan view, portions of the upper surface of the first sacrifice pattern SC1 and the upper surface of the second insulating substrate INS2 are exposed through the areas from which the second sacrifice layer is removed.

In the exemplary embodiment, the first sacrifice pattern SC1 and the second sacrifice pattern SC2 are formed by performing the photolithography process two times, but the method should not be limited to two times. That is, the first sacrifice pattern SC1 and the second sacrifice pattern SC2 may be formed by performing the photolithography process once using a slit mask or a diffraction mask.

Figure 6C:
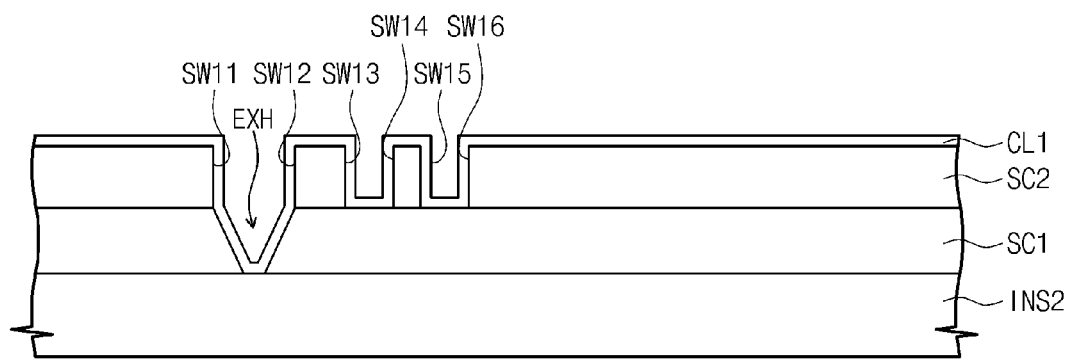

Then, as shown in FIG. 6C, a first conductive layer CL1 is formed on the second sacrifice pattern SC2, the exposed upper surface of the first sacrifice pattern SC1, the first sacrifice sidewalls SW11 to SW16 and the exposed upper surface of the second insulating substrate INS2. The first conductive layer CL1 may include a metal material, a dielectric material, or a semiconductor material. The metal material may include aluminum (Al), copper (Cu), nickel (Ni), chromium (Cr), molybdenum (Mo), titanium (Ti), tantalum (Ta), niobium (Nb), neodymium (Nd) or an alloy thereof. The dielectric material may include $Al_2O_3$, $SiO_2$, $Ta_2O_5$ or $Si_3N_4$. The semiconductor material may include diamond shape carbon, Si, Ge, GaAs or CdTe, but the semiconductor material should not be limited thereto or thereby. In the exemplary embodiment, the first conductive layer CL1 includes an amorphous silicon a-Si. In addition, the first conductive layer CL1 has a single-layer structure, but the first conductive layer CL1 should not be limited to the single-layer structure. That is, the first conductive layer CL1 may have a multi-layer structure, e.g., a double-layer structure of the amorphous silicon a-Si and a metal layer.

Figure 6D:
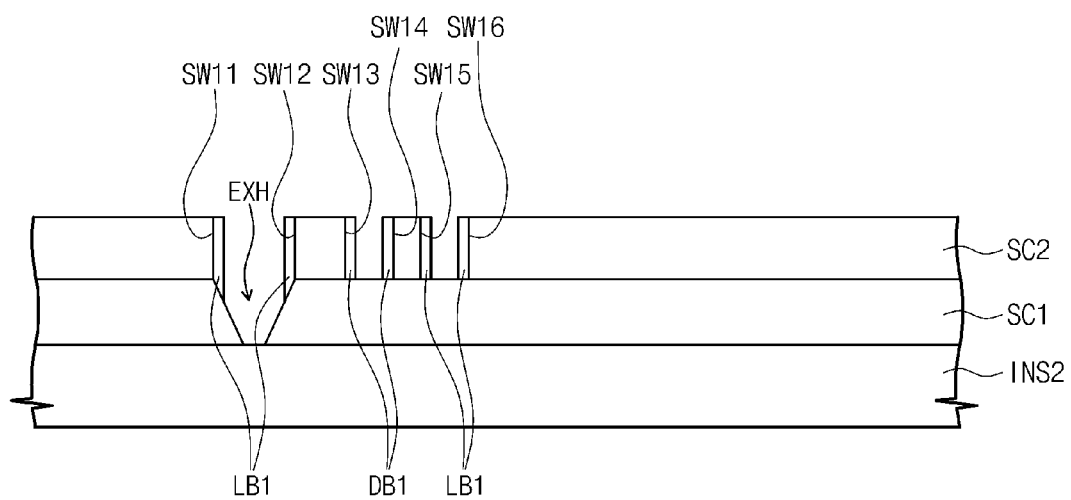

Referring to FIG. 6D, the first conductive layer CL1 is etched. As a result, the first deformable electrode portion LB1 and the first driving beam electrode portion DB1 are formed. The first conductive layer CL1 is anisotropic etched in a direction vertical to the upper surface of the second insulating substrate INS2. Due to the anisotropic etch, a portion of the first conductive layer CL1, which is substantially parallel to the upper surface of the second insulating substrate INS2, is etched, and a portion of the first conductive layer CL1, which is vertical to the upper surface of the second insulating substrate INS2 and makes contact with the first sacrifice sidewalls SW11 to SW16, remains without being etched. As a result, the first deformable electrode portion LB1 and the first driving beam electrode portion DB1 are formed in the plate-like shape vertical to the upper surface of the second insulating substrate INS2. In addition, at least one surface of each of the first deformable electrode portion LB1 and the first driving beam electrode portion DB1 makes contact with a corresponding first sacrifice sidewall of the first sacrifice sidewalls SW11 to SW16.

Figure 6E:
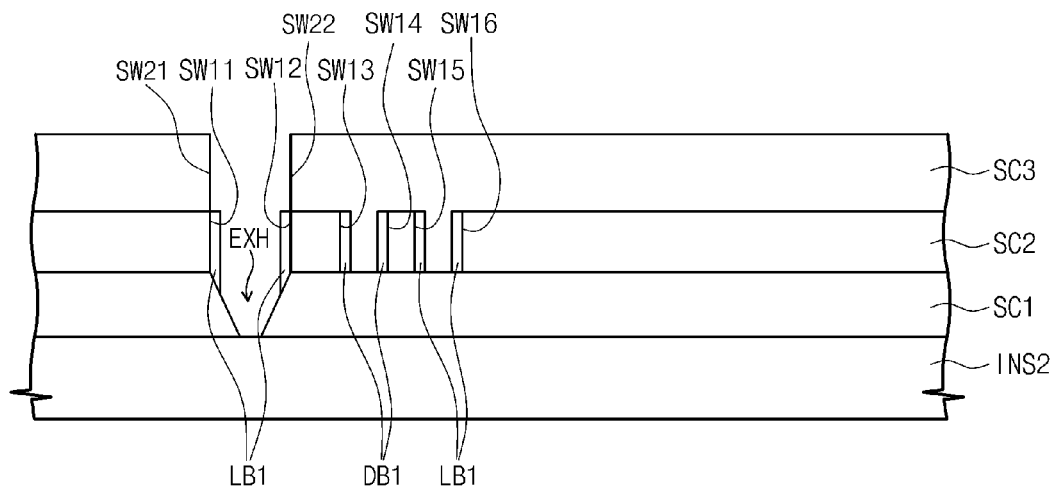

Then, as shown in FIG. 6E, a third sacrifice pattern SC3 is formed on the second sacrifice pattern SC2. The third sacrifice pattern SC3 is formed by forming a third sacrifice layer on the second sacrifice pattern SC2 and patterning the third sacrifice layer using a photolithography process. During the photolithography process, the third sacrifice layer is partially etched, and thus second sacrifice sidewalls SW21 and SW22 are formed, which are vertical to the upper surface of the second insulating substrate INS2. The second sacrifice sidewalls SW21 and SW22 respectively correspond to and are aligned with the first sacrifice sidewalls SW11 and SW12 that are connected to ends of the exposure hole EXH of the first sacrifice pattern SC1. When viewed in a plan view, a portion of the upper surface of the first sacrifice pattern SC1 and a portion of the upper surface of the second insulating substrate INS2 are exposed through the area from which the third sacrifice layer is removed.

Figure 6F:
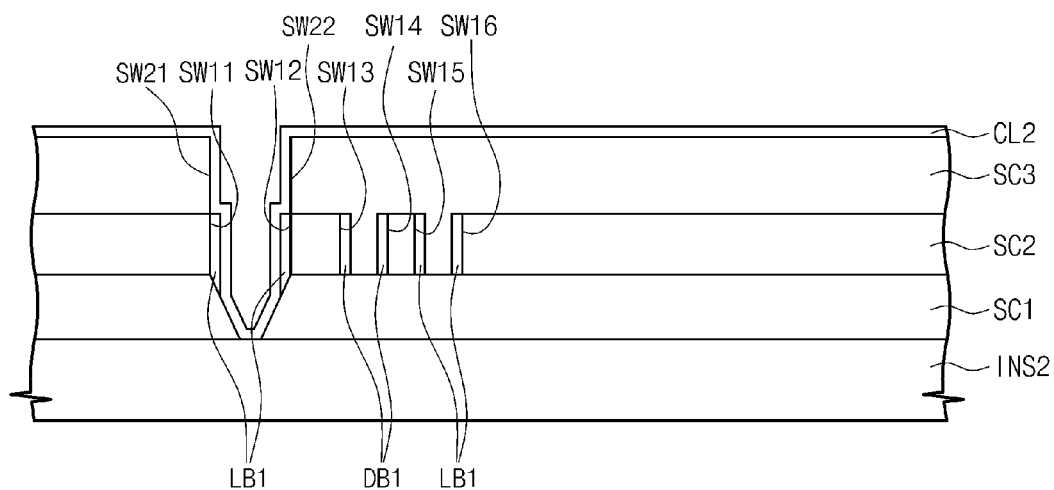

Referring to FIG. 6F, a second conductive layer CL2 is formed on the third sacrifice pattern SC3, the exposed upper surface of the first sacrifice pattern SC1 the first sacrifice sidewalls SW11 and SW12, the second sacrifice sidewalls SW21 and SW22 and the exposed upper surface of the second insulating substrate INS2. The second conductive layer CL2 may include a metal material, a dielectric material or a semiconductor material. The metal material may include aluminum (Al), copper (Cu), nickel (Ni), chromium (Cr), molybdenum (Mo), titanium (Ti), tantalum (Ta), niobium (Nb), neodymium (Nd), or an alloy thereof. The dielectric material may include $Al_2O_3$, $SiO_2$, $Ta_2O_5$ or $Si_3N_4$. The semiconductor material may include diamond shape carbon, Si, Ge, GaAs and CdTe, but the semiconductor material should not be limited thereto or thereby. In the exemplary embodiment, the second conductive layer CL2 has a double-layer structure of an amorphous silicon a-Si and aluminum (Al). In the exemplary embodiment, the second conductive layer CL2 has the double-layer structure, but the second conductive layer CL2 should not be limited to the double-layer structure. That is, the second conductive layer CL2 may have a single-layer structure including aluminum (Al).

Figure 6G:
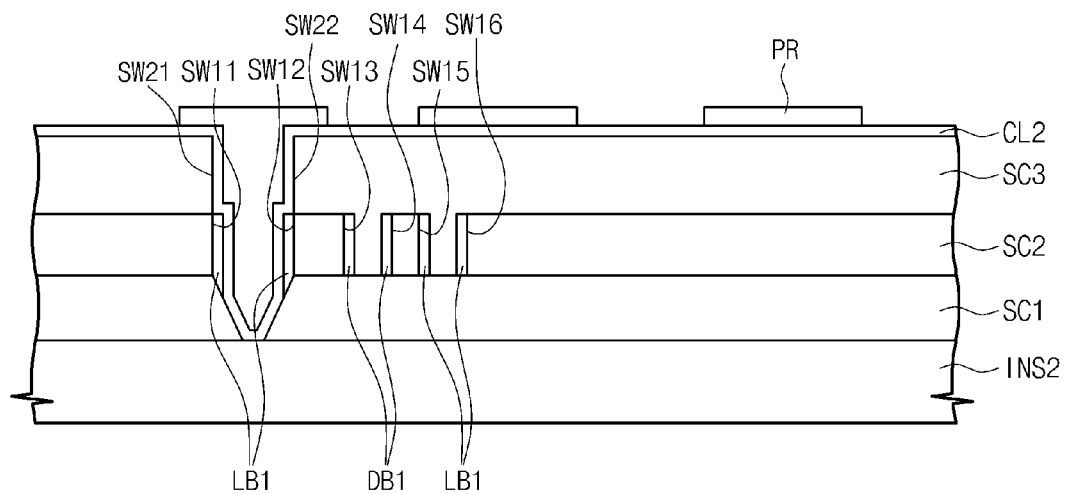

Referring to FIG. 6G, a photoresist layer pattern PR is formed on the second insulating substrate INS2. The photoresist layer pattern PR is formed by coating a photoresist layer on the second insulating substrate INS2 and exposing and developing the photoresist layer. The photoresist layer pattern PR is formed in areas corresponding to the first supporter SP1 and the shutter SHT.

Figure 6H:
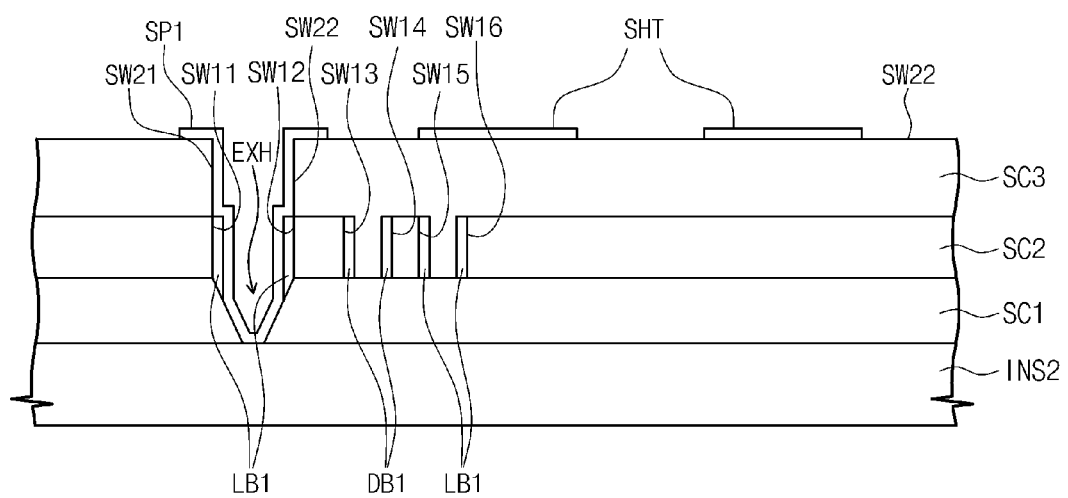

Next, as shown in FIG. 6H, the second conductive layer CL2 is etched using the photoresist layer pattern PR as a mask and the photoresist layer pattern PR is removed. As a result, the first supporter SP1 and the shutter SHT are formed. The first supporter SP1 is connected to the first deformable electrode portion LB1 and the shutter SHT, and formed on an inclined surface of the exposure hole EXH of the first sacrifice pattern SC1, the first sacrifice sidewalls SW11 and SW12, and the second sacrifice sidewalls SW21 and SW22. The shutter SHT is formed on the third sacrifice pattern SC3 and substantially parallel to the upper surface of the second insulating substrate INS2.

Figure 6I:
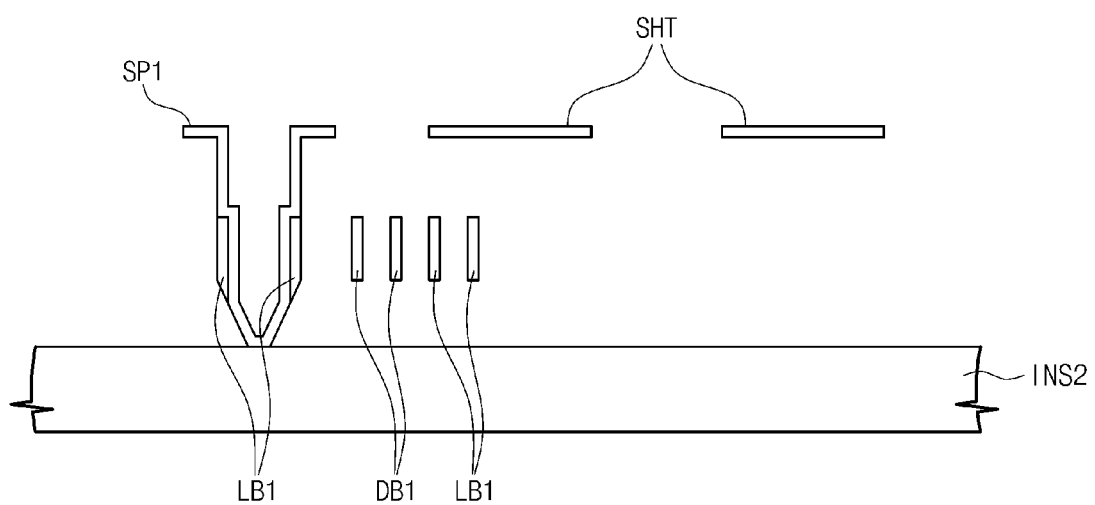

Then, referring to FIG. 6I, the first sacrifice pattern SC1, the second sacrifice pattern SC2 and the third sacrifice pattern SC3 are removed. The first sacrifice pattern SC1, the second sacrifice pattern SC2 and the third sacrifice pattern SC3 are etched by isotropic etching process. The first, second, and third sacrifice patterns SC1, SC2 and SC3 may be removed by the same single process.

Hereinafter, another exemplary embodiment of a method of manufacturing a display apparatus according to the invention will be described in detail with reference to FIGS. 7A to 7I. In this case, FIGS. 4 and 5 may be further referred to for the description of the method.

FIGS. 7A to 7I are cross-sectional views showing another exemplary embodiment of a method of manufacturing a second substrate of a display apparatus according to the invention. In the display apparatus shown in FIGS. 7A to 7I, a first substrate SUB1, a second insulating substrate INK, a deformable electrode LB, and a driving beam electrode DB are substantially same as those of the display apparatus shown in FIGS. 6A to 6I except for a shutter SHT. Accordingly, the shutter SHT will be mainly described in detail in the exemplary embodiment. In addition, in FIGS. 7A to 7I, the same reference numerals denote the same elements in FIGS. 6A to 6I, and thus detailed descriptions of the same elements will be omitted.

Figure 7A:
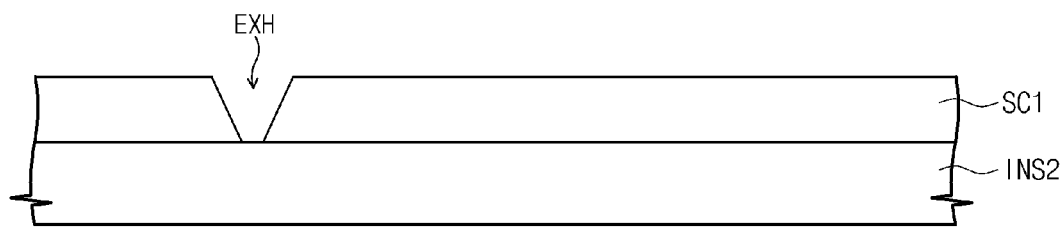
FIGS. 7A to 7I are cross-sectional views showing another exemplary embodiment of a method of manufacturing a second substrate of a display apparatus according to the invention.

Referring to FIG. 7A, a first switching device (not shown) is formed on the second insulating substrate INS2, and a first sacrifice pattern SC1 is formed on the second insulating substrate INS2 including the first switching device (not shown).

The first switching device (not shown) may be formed using a plurality of masks. The first sacrifice pattern SC1 is formed on the second insulating substrate INS2 and provided with an exposure hole EXH to expose a portion of the first switching device (not shown). The first sacrifice pattern SC1 is formed by forming a first sacrifice layer on the second insulating substrate INS2 including the first switching device (not shown) and patterning the first sacrifice layer using a photolithography process.

Figure 7B:
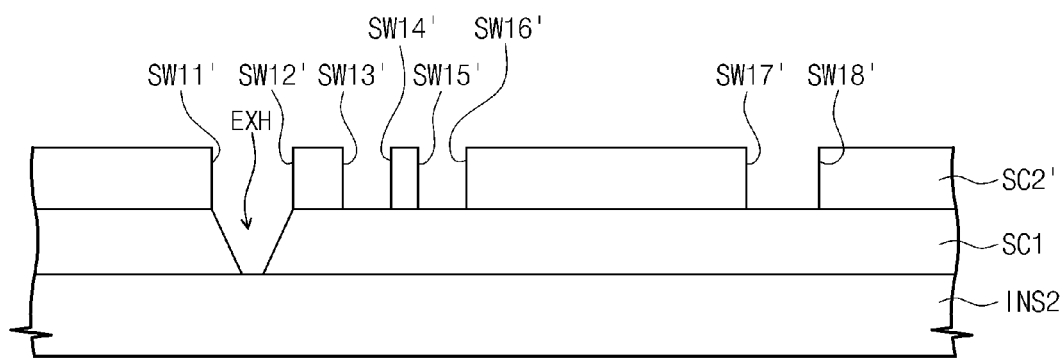

Referring to FIG. 7B, a second sacrifice pattern SC2' is formed on the first sacrifice pattern SC1. The second sacrifice pattern SC2' is formed by forming a second sacrifice layer on the first sacrifice pattern SC1 and patterning the second sacrifice layer using a photolithography process. During the photolithography process, the second sacrifice layer is partially etched, and thus first sacrifice sidewalls SW11' to SW18' are formed, which are vertical (e.g., substantially perpendicular) to the upper surface of the second insulating substrate INS2. When viewed in a plan view, portions of the upper surface of the first sacrifice pattern SC1 and the upper surface of the second insulating substrate INS2 are exposed through the areas from which the second sacrifice layer is removed.

In the exemplary embodiment, the first sacrifice pattern SC1 and the second sacrifice pattern SC2' are formed by performing the photolithography process two times, but the method should not be limited to two times. That is, the first sacrifice pattern SC1 and the second sacrifice pattern SC2' may be formed by performing the photolithography process once using a slit mask or a diffraction mask.

Figure 7C:
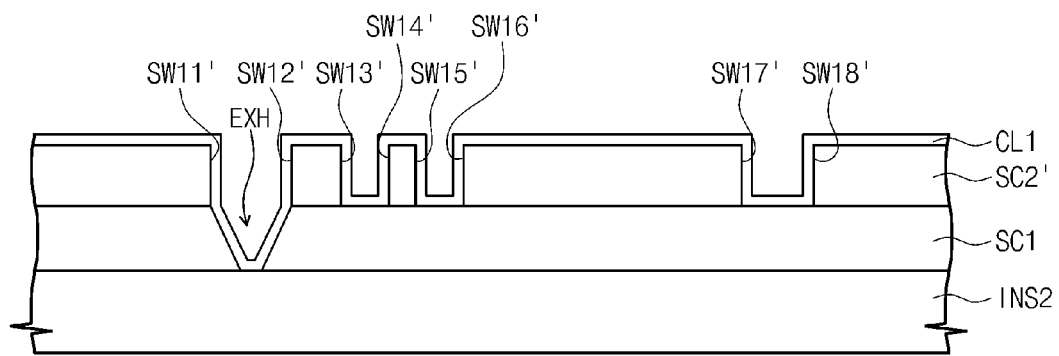

Then, as shown in FIG. 7C, a first conductive layer CL1 is formed on the second sacrifice pattern SC2', the exposed upper surface of the first sacrifice pattern SC1, the first sacrifice sidewalls SW11' to SW18' and the exposed upper surface of the second insulating substrate INS2. The first conductive layer CL1 may include a metal material, a dielectric material, or a semiconductor material. The metal material may include aluminum (Al), copper (Cu), nickel (Ni), chromium (Cr), molybdenum (Mo), titanium (Ti), tantalum (Ta), niobium (Nb), neodymium (Nd), or an alloy thereof. The dielectric material may include $Al_2O_3$, $SiO_2$, $Ta_2O_5$ or $Si_3N_4$. The semiconductor material may include diamond shape carbon, Si, Ge, GaAs or CdTe, but the semiconductor material should not be limited thereto or thereby. In the exemplary embodiment, the first conductive layer CL1 includes an amorphous silicon a-Si. In addition, the first conductive layer CL1 has a single-layer structure, but the first conductive layer CL1 should not be limited to the single-layer structure. That is, the first conductive layer CL1 may have a multi-layer structure, e.g., a double-layer structure of the amorphous silicon a-Si and a metal layer.

Figure 7D:
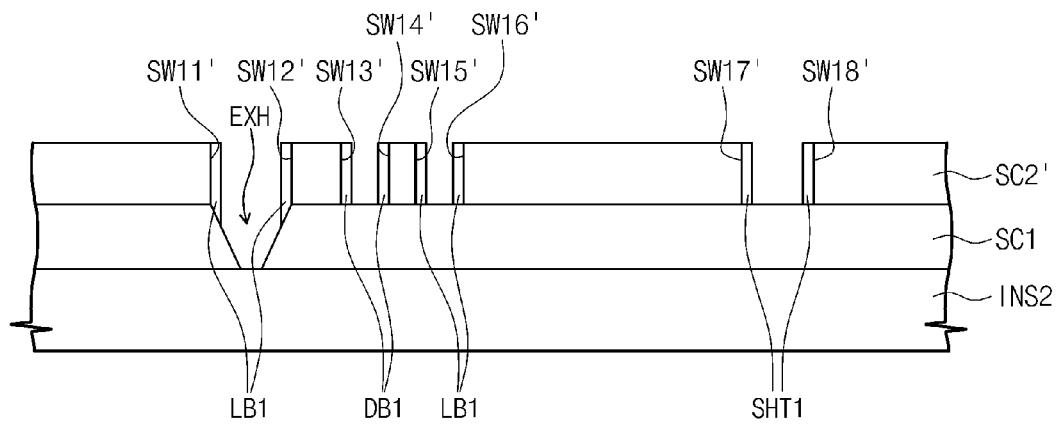

Referring to FIG. 7D, the first conductive layer CL1 is etched. As a result, the first deformable electrode portion LB1, the first driving beam electrode portion DB1 and a first shutter portion SHT1 are formed. The first conductive layer CL1 is anisotropic etched in a direction vertical to the upper surface of the second insulating substrate INS2. Due to the anisotropic etch, a portion of the first conductive layer CL1, which is substantially parallel to the upper surface of the second insulating substrate INS2, is etched, and a portion of the first conductive layer CL1, which is vertical to the upper surface of the second insulating substrate INS2 and makes contact with the first sacrifice sidewalls SW11' to SW18', remains without being etched. As a result, the first deformable electrode portion LB1, the first driving beam electrode portion DB1 and the first shutter portion SHT1 are formed in the plate-like shape vertical to the upper surface of the second insulating substrate INS2. In addition, at least one surface of each of the first deformable electrode portion LB1, the first driving beam electrode portion DB1 and the first shutter portion SHT1 makes contact with a corresponding first sacrifice sidewall of the first sacrifice sidewalls SW11' to SW18'.

Figure 7E:
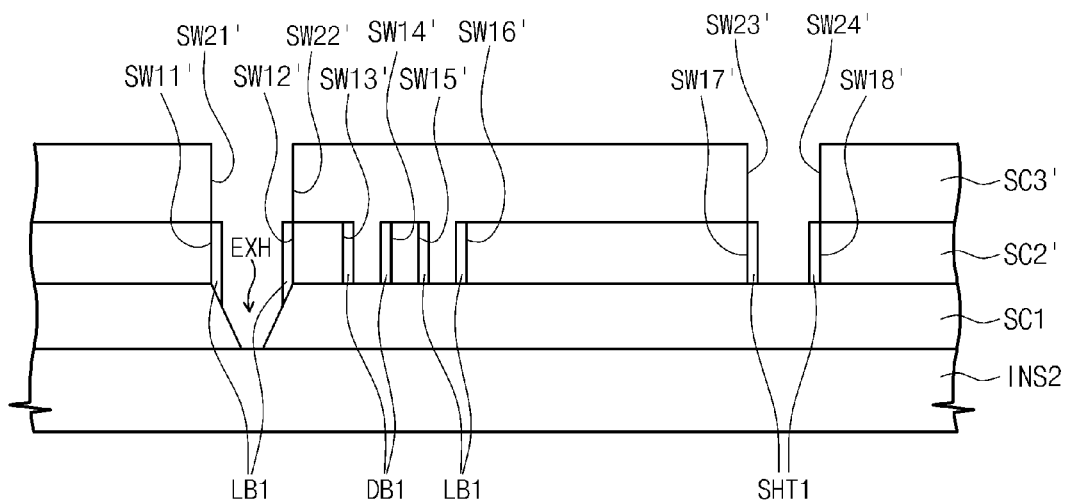

Then, a third sacrifice pattern SC3' is formed on the second sacrifice pattern SC2' as shown in FIG. 7E. The third sacrifice pattern SC3' is formed by forming a third sacrifice layer on the second sacrifice pattern SC2' and patterning the third sacrifice layer using a photolithography process. During the photolithography process, the third sacrifice layer is partially etched, and thus second sacrifice sidewalls SW21', SW22', SW23' and SW24' are formed, which are vertical to the upper surface of the second insulating substrate INS2. The second sacrifice sidewalls SW21' and SW22' respectively correspond to and are aligned with the first sacrifice sidewalls SW11' and SW12' that are connected to ends of the exposure hole EXH of the first sacrifice pattern SC1, and the second sacrifice sidewalls SW23' and SW24' are respectively correspond to and are aligned with the first sacrifice sidewalls SW17' and SW18' in which the first shutter portion SHT1 is formed. When viewed in a plan view, a portion of the upper surface of the first sacrifice pattern SC1 and a portion of the upper surface of the second insulating substrate INS2 are exposed through the area from which the third sacrifice layer is removed.

Figure 7F:
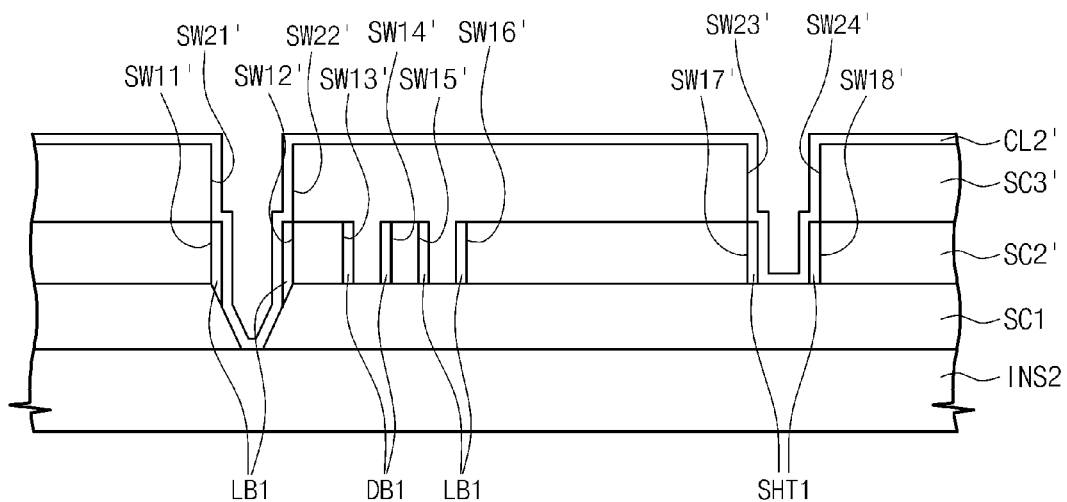

Referring to FIG. 7F, a second conductive layer CL2' is formed on the third sacrifice pattern SC3', the exposed upper surface of the first sacrifice pattern SC1, the first sacrifice sidewalls SW11', SW12', SW17' and SW18', the second sacrifice sidewalls SW21', SW22', SW23' and SW24', and the exposed upper surface of the second insulating substrate INS2. The second conductive layer CL2' may include a metal material, a dielectric material or a semiconductor material. The metal material may include aluminum (Al), copper (Cu), nickel (Ni), chromium (Cr), molybdenum (Mo), titanium (Ti), tantalum (Ta), niobium (Nb), neodymium (Nd), or an alloy thereof. The dielectric material may include $Al_2O_3$, $SiO_2$, $Ta_2O_5$ or $Si_3N_4$. The semiconductor material may include diamond shape carbon, Si, Ge, GaAs or CdTe, but the semiconductor material should not be limited thereto or thereby. In the exemplary embodiment, the second conductive layer CL2' has a double-layer structure of an amorphous silicon a-Si and aluminum (Al). In the exemplary embodiment, the second conductive layer CL2' has the double-layer structure, but the second conductive layer CL2' should not be limited to the double-layer structure. That is, the second conductive layer CL2' may have a single-layer structure including aluminum (Al).

Figure 7G:
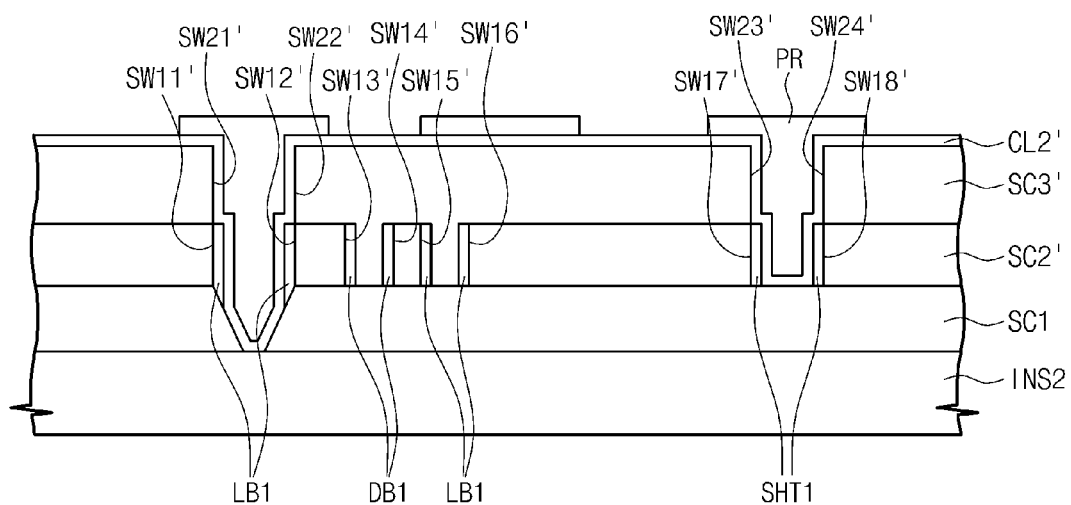

Referring to FIG. 7G, a photoresist layer pattern PR is formed on the second insulating substrate INS2. The photoresist layer pattern PR is formed by coating a photoresist layer on the second insulating substrate INK and exposing and developing the photoresist layer. The photoresist layer pattern PR is formed in areas corresponding to a first supporter and a shutter.

Figure 7H:
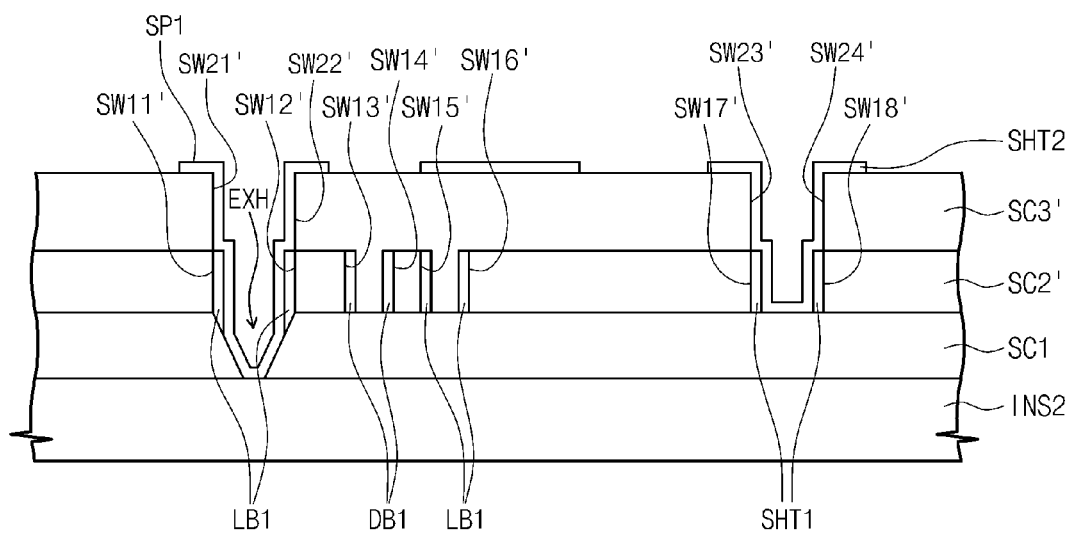

Next, as shown in FIG. 7H, the second conductive layer CL2' is etched using the photoresist layer pattern PR as a mask and the photoresist layer pattern PR is removed. As a result, a first supporter SP1 and a second shutter portion SHT2 are formed. The first supporter SP1 is connected to the first deformable electrode portion LB1 and the second shutter portion SHT2, and formed on an inclined surface of the exposure hole EXH of the first sacrifice pattern SC1, the first sacrifice sidewalls SW11' and SW12', and the second sacrifice sidewalls SW21' and SW22'.

The second shutter portion SHT2 is formed on the second sacrifice sidewalls SW23' and SW24', the first shutter portion SHT1, the upper surface of the first sacrifice pattern SC1 that connects ends of the first shutter portion SHT1 to each other, and the third sacrifice pattern SC3'.

Figure 7I:
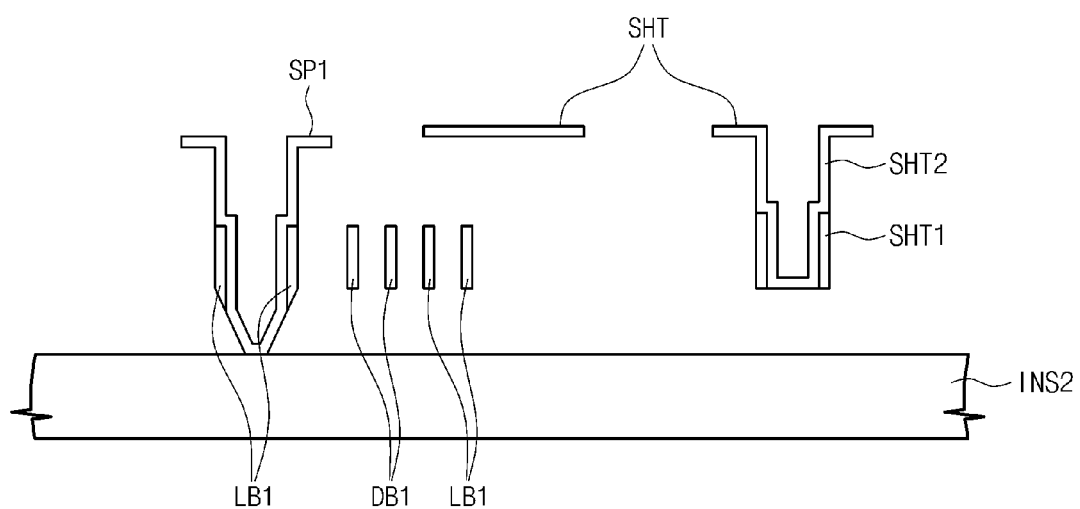

Then, referring to FIG. 7I, the first sacrifice pattern SC1, the second sacrifice pattern SC2', and the third sacrifice pattern SC3' are removed. The first sacrifice pattern SC1, the second sacrifice pattern SC2', and the third sacrifice pattern SC3' are etched by isotropic etching process. The first, second, and third sacrifice patterns SC1, SC2', and SC3' may be removed by the same single process.

Figure 8A:
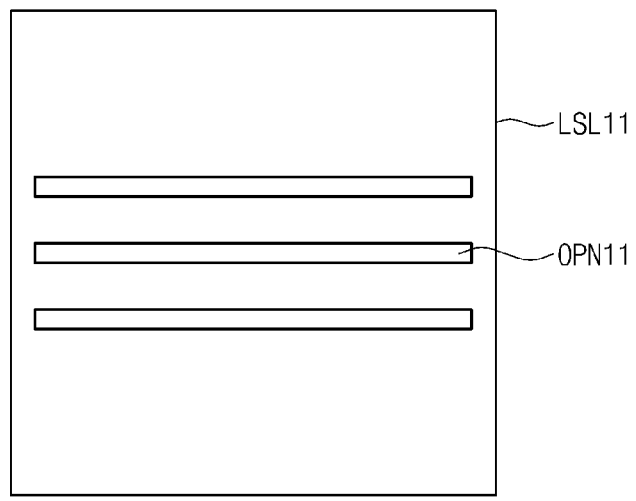
FIGS. 8A and 8B are plan views showing improved aperture ratio of an exemplary embodiment of a light blocking layer of a display apparatus according to the invention, compared with a light blocking layer of a conventional display apparatus.
Figure 8B:
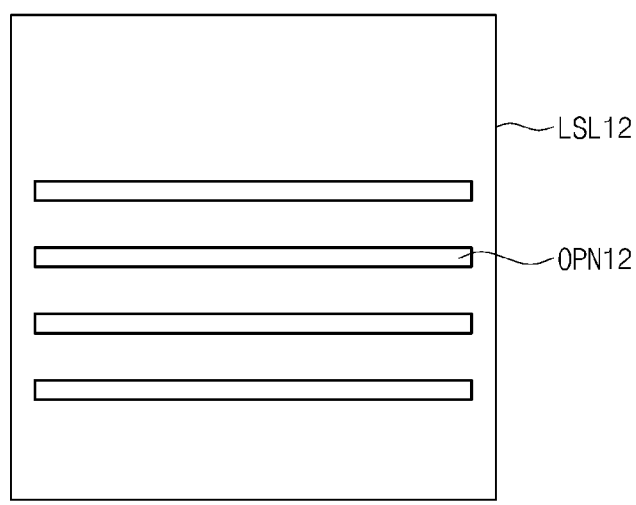

FIGS. 8A and 8B are plan views showing improved aperture ratio of an exemplary embodiment of a light blocking layer of a MEMS display apparatus according to the invention compared with a light blocking layer of a conventional MEMS display apparatus.

According to the conventional MEMS display apparatus shown in FIG. 8A, a light shielding layer LSL11 includes three first openings OPN11 which extend through a thickness thereof and have a slit shape in the plan view. In addition, second openings are formed through a shutter to correspond to and align with the first openings OPN11 and have the same planar size and shape as those of the first openings OPN11. In the conventional MEMS display apparatus including the first openings OPN11 and the second openings, the aperture ratio has been shown to be about 17.3% with respect to one pixel area.

According to the portion of the exemplary embodiment of the MEMS display apparatus shown in FIG. 8B according to the invention, the light shielding layer LSL12 includes four first openings OPN12 which extend through a thickness thereof and have a slit shape having the planar same size and shape as those of the first openings OPN11 in the conventional MEMS display apparatus, since the first openings OPN12 in the light shielding layer provide areas overlapped with the deformable beam electrode and the driving beam electrode. In addition, since the shutter is spaced apart from the deformable electrode and the driving beam electrode in the direction vertical to the second substrate, the shutter may move to overlap with the deformable electrode and the driving beam electrode. Second openings may extend through a thickness of the shutter to correspond to the first openings OPN12 and have the same planar size and shape as those of the slits of the first openings OPN12. In the one or more embodiments of the MEMS display apparatus according to the invention, to which the first openings OPN12 in the light shielding layer and the second openings are provided in the shutter, the aperture ratio has been shown to be about 21.6% with respect to one pixel area.

Figure 9:
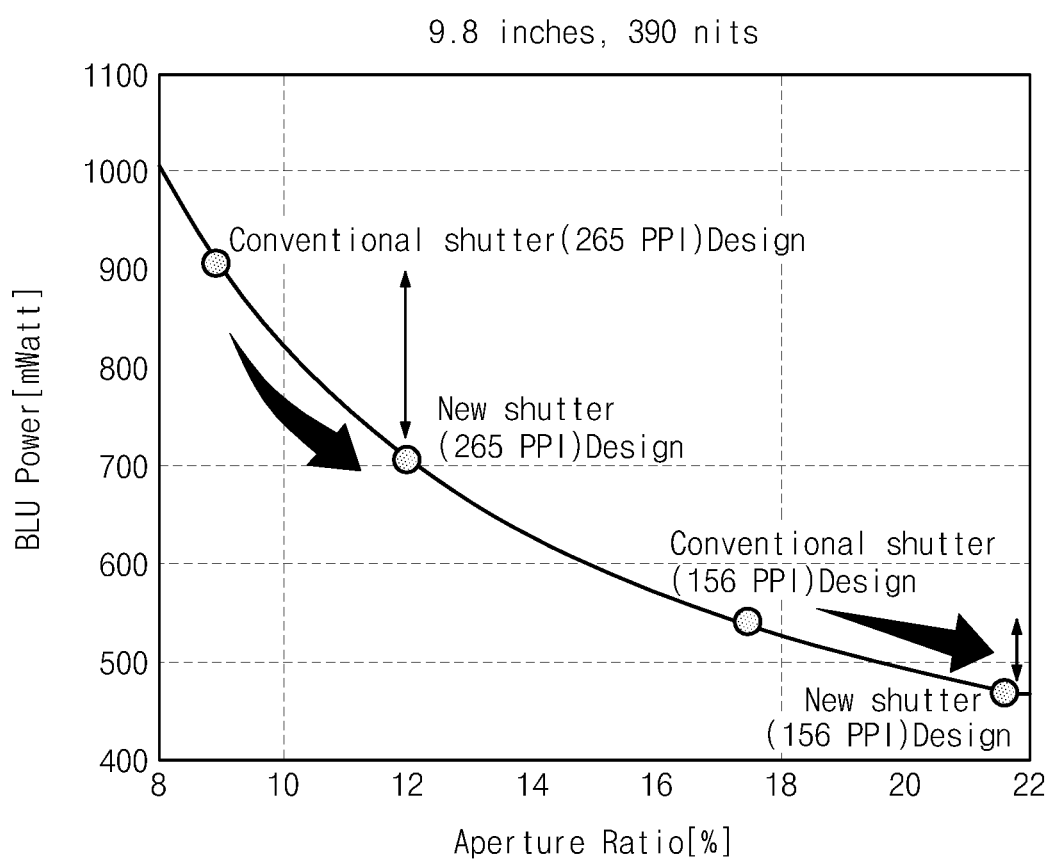
FIG. 9 is a graph showing improvement in power consumption of an exemplary embodiment of a display apparatus according to the present invention, compared with a conventional display apparatus.

FIG. 9 is a graph showing improvement in power consumption of an exemplary embodiment of a display apparatus according to the invention compared with a conventional display apparatus.

According to the conventional MEMS display apparatus, the aperture ratio in percent (%) has been shown to be about 17.3% in a display of 9.8 inches having 156 pixels per inch (156 PPI). In this case, a backlight unit (BLU) requires power consumption of about 540 milliwatts (mW) for brightness of about 390 candela per square meter (nits).

According to the one or more exemplary embodiment of the MEMS display apparatus according to the invention, the aperture ratio has been improved to about 21.6% in a display of 9.8 inches (New Shutter 156 PPI). In this case, the backlight unit BLU requires power consumption of about 470 mW to allow the brightness to be equal to the brightness in the conventional MEMS display apparatus. Consequently, the power consumption in the MEMS display apparatus may be reduced about 70 mW when compared with the power consumption in the conventional MEMS display apparatus, and the power consumption in one or more of the exemplary embodiments of the MEMS display apparatus according to the invention may be improved by nearly about 13%.

Particularly, as a resolution of the MEMS display apparatus is enhanced, the power consumption may be further improved compared to the conventional MEMS display apparatus. When the resolution is enhanced, the number of the pixels increases, and thus the power consumption is affected by the aperture ration in each pixel. As shown in FIG. 9, for instance, according to the conventional MEMS display apparatus, the backlight unit BLU requires the power consumption of about 900 mW for the brightness of about 390 nits in a display of 9.8 inches (265 PPI).

However, according to one or more of the exemplary embodiments of the MEMS display apparatus according to the invention, the backlight unit BLU requires the power consumption of about 700 mW for the brightness of about 390 nits in a display of 9.8 inches (New Shutter 265 PPI). Consequently, the power consumption in the exemplary embodiment of the MEMS display apparatus may be reduced about 200 mW when compared to the power consumption in the conventional MEMS display apparatus. When compared with the display of 9.8 inches having 156 PPI, the amount of reduction of the power consumption in the display of 9.8 inches having 265 PPI becomes large.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
a first insulating substrate;
a light shielding layer on the first insulating substrate and including a first opening through which a light passes;
a second insulating substrate which faces the first insulating substrate; and
a shutter part on the second insulating substrate, the shutter part comprising:
a driving beam electrode;
a deformable electrode which faces the driving beam electrode, wherein the deformable electrode moves in response to a voltage which is applied to the driving beam electrode; and
a shutter comprising a second opening which corresponds to the first opening of the light shielding layer, wherein the shutter is connected to the deformable electrode, and overlaps one of the deformable electrode or the driving beam electrode according to a movement of the deformable electrode, in a plan view.
2. The display apparatus of claim 1, wherein
the shutter further comprises a first flat plate which is substantially parallel to an upper surface of the second insulating substrate,
the first flat plate comprises a lower surface which faces the second insulating substrate, and an upper surface which faces the first insulating substrate, and
the driving beam electrode and the deformable electrode are spaced apart from the lower surface of the first flat plate in a direction substantially perpendicular to the upper surface of the second insulating substrate.
3. The display apparatus of claim 2, wherein the driving beam electrode and the deformable electrode are in a different layer from the shutter.
4. The display apparatus of claim 2, wherein the shutter further comprises two materials different from each other.

5. The display apparatus of claim 1, wherein
the shutter is substantially parallel to an upper surface of the second insulating substrate and comprises:
  a second flat plate comprises a lower surface which faces the second insulating substrate, and an upper surface which faces the first insulating substrate, and
  a protrusion part which protrudes from the lower surface of the second flat plate toward the second insulating substrate, the protrusion part comprising:
    a first sidewall between the lower surface of the second flat plate and the upper surface of the second insulating substrate, the first sidewall including two sidewall portions which are substantially perpendicular to the upper surface of the second insulating substrate and face each other;
    a second sidewall including two sidewall portions which are substantially perpendicular to the upper surface of the second substrate, face each other and are substantially parallel to the first sidewall, each of the two sidewall portions including two bends at a position where the second sidewall contacts the first sidewall; and
    a third flat plate which is substantially parallel to the upper surface of the second insulating substrate, and includes an upper surface which faces the first insulating substrate and a lower surface which faces the second insulating substrate, wherein the lower surface of the third flat plate connects an end of the first sidewall and an end of the second sidewall to each other.

6. The display apparatus of claim 5, wherein the deformable electrode and the driving beam electrode are spaced apart from the lower surface of the second flat plate in a direction substantially perpendicular to the upper surface of the second insulating substrate.

7. The display apparatus of claim 6, wherein the shutter further comprises:
  a first shutter portion including the first sidewall; and
  a second shutter portion including the second sidewall, the second flat plate and the third flat plate.

8. The display apparatus of claim 7, wherein the deformable electrode, the driving beam electrode and the first shutter are in a different layer from the second shutter.

9. The display apparatus of claim 7, wherein the second shutter portion further includes two materials different from each other.

10. The display apparatus of claim 1, wherein
the deformable electrode comprises a first deformable electrode portion which is connected to a first side of the shutter, and a second deformable electrode portion which is connected to a second side of the shutter, and
the driving beam electrode comprises a first driving beam electrode portion which faces the first deformable electrode portion, and a second driving beam electrode portion which faces the second deformable electrode portion.

11. The display apparatus of claim 1, wherein the shutter further comprises a supporter which connects the deformable electrode and the driving beam electrode to the second insulating substrate.

12. The display apparatus of claim 1, wherein each of the first opening and the second opening is provided in plural.

13. A shutter unit comprising:
  a driving beam electrode;
  a deformable electrode which faces the driving beam electrode and moves in response to a voltage which is applied to the driving beam electrode; and
  a shutter including an opening, wherein the shutter is connected to the deformable electrode, and overlaps one of the deformable electrode or the driving beam electrode according to a movement of the deformable electrode, in a plan view.

* * * * *